United States Patent
Wakisaka et al.

(10) Patent No.: US 10,891,861 B2
(45) Date of Patent: Jan. 12, 2021

(54) INFORMATION PROVISION SYSTEM, SERVER, AND INFORMATION PROVISION METHOD

(71) Applicant: Mitsubishi Electric Corporation, Tokyo (JP)

(72) Inventors: Yoshitaka Wakisaka, Hyogo (JP); Yasunori Hoshihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 16/095,501

(22) PCT Filed: May 16, 2016

(86) PCT No.: PCT/JP2016/064470
§ 371 (c)(1),
(2) Date: Oct. 22, 2018

(87) PCT Pub. No.: WO2017/199287
PCT Pub. Date: Nov. 23, 2017

(65) Prior Publication Data
US 2019/0130740 A1 May 2, 2019

(51) Int. Cl.
*G08G 1/0969* (2006.01)
*G08G 1/01* (2006.01)
(Continued)

(52) U.S. Cl.
CPC ........... *G08G 1/0969* (2013.01); *G01C 21/00* (2013.01); *G08G 1/0125* (2013.01); *H04W 4/44* (2018.02);
(Continued)

(58) Field of Classification Search
CPC .... G08G 1/0969; G08G 1/0125; G01C 21/00; G01C 21/26; H04W 4/44; H04W 4/04
See application file for complete search history.

(56) References Cited

U.S. PATENT DOCUMENTS

2017/0032589 A1* 2/2017 Zagajac .............. H04L 67/1097

FOREIGN PATENT DOCUMENTS

| JP | 2001-235335 A | 8/2001 |
| JP | 2009-71668 A | 4/2009 |
| JP | 2014-17656 A | 1/2014 |

OTHER PUBLICATIONS

International Search Report issued in PCT/JP2016/064470 (PCT/ISA/210), dated Aug. 9, 2016.

* cited by examiner

*Primary Examiner* — Anne Marie Antonucci
(74) *Attorney, Agent, or Firm* — Birch, Stewart, Kolasch & Birch, LLP

(57) ABSTRACT

A receiving unit (20) receives pieces of request information indicating pieces of information requested by in-vehicle devices (3A to 3D) of vehicles (A to D) and pieces of condition information indicating the internal and external conditions of the vehicles (A to D). A delivery control unit (21) sets priorities for information transmission for types of respective pieces of information indicated by the pieces of request information and for the internal and external conditions of the vehicles (A to D) indicated by the pieces of condition information, and determines a transmission schedule for transmitting pieces of information to the in-vehicle devices (3A to 3D), on the basis of the priorities. A transmitting unit (22) transmits the pieces of information to the in-vehicle devices (3A to 3D), according to the transmission schedule.

7 Claims, 6 Drawing Sheets

(51) Int. Cl.
*H04W 4/44* (2018.01)
*H04W 4/48* (2018.01)
*G01C 21/00* (2006.01)
*H04W 72/10* (2009.01)
*G01C 21/26* (2006.01)
(52) U.S. Cl.
CPC ............. *H04W 4/48* (2018.02); *H04W 72/10* (2013.01); *G01C 21/26* (2013.01)

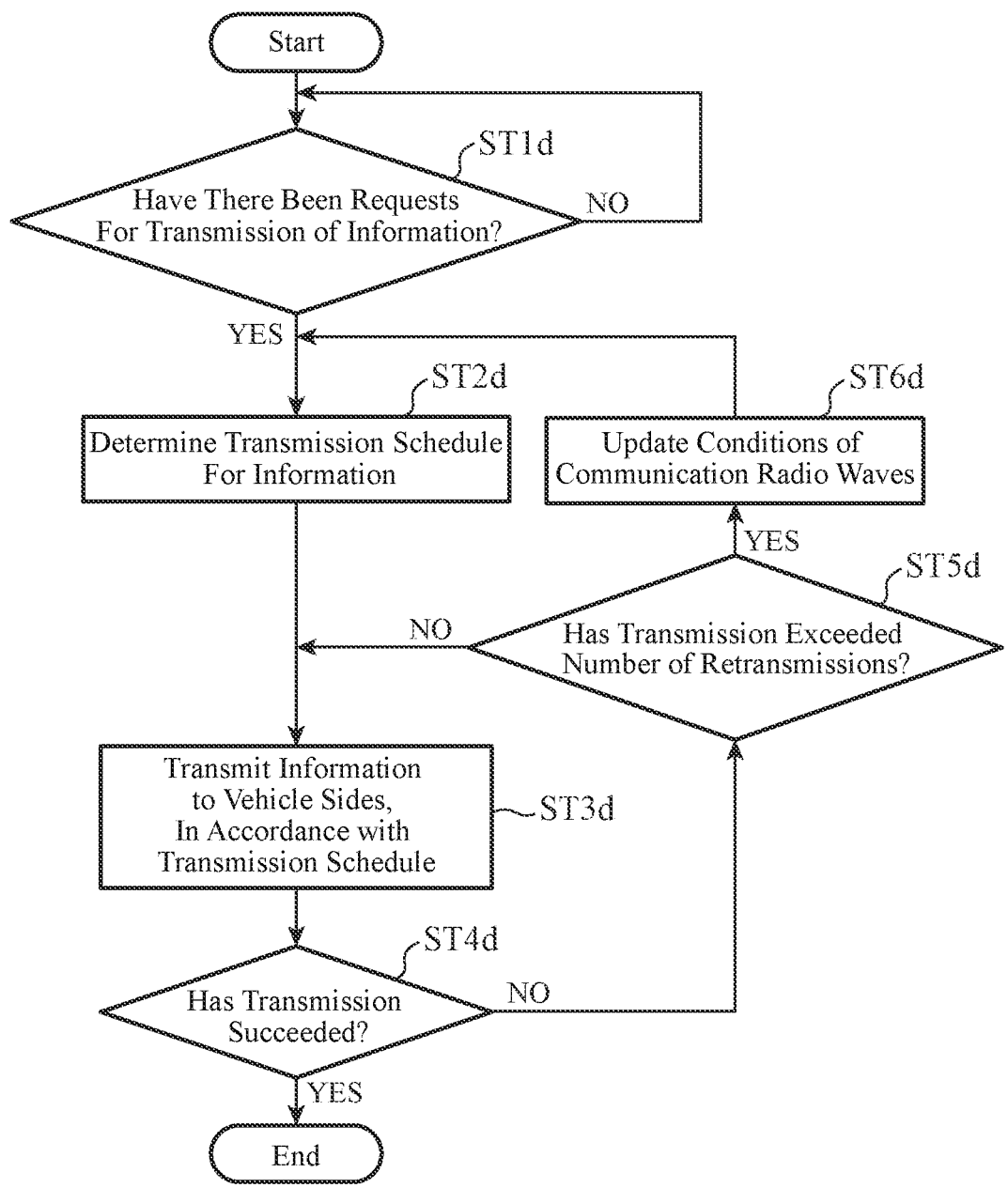

FIG. 8

| | Vehicle Speed | Conditions of Communication Radio Waves | Communication Conditions Ahead | Visibility Conditions Around Vehicle | Type of Communication Content | Priority | | Allocation of Communication Bandwidth | |
|---|---|---|---|---|---|---|---|---|---|
| | Condition A<br>Fast 2<br>Normal 1<br>Slow 0<br>Stop −1 | Condition B<br>Excellent 2<br>Normal 1<br>Poor 0 | Condition C<br>Excellent 2<br>Normal 1<br>Poor 0 | Condition D<br>Excellent 2<br>Normal 1<br>Poor 0 | Condition E<br>Map 5<br>Stream 4<br>Web Information 1 | Scores For Determining Priority Conditions A+B+D+E | 1 ~ 5<br>Low High | Scores For Determining Priority Conditions C+E | 1 ~ 5<br>Small Large |
| Vehicle A | Fast | Excellent | Excellent | Excellent | Stream | 2+2+2+4=10 | 5 | 2+4=6 | 5 |
| Vehicle B | Fast | Normal | Poor | Normal | Web Information | 2+1+1+1=5 | 1 | 0+1=1 | 1 |
| Vehicle C | Fast | Poor | Poor | Poor | Map | 2+0+0+5=7 | 4 | 0+5=5 | 3 |
| Vehicle D | Fast | Excellent | Poor | Poor | Map | 2+2+0+5=9 | 4 | 0+5=5 | 3 |

INFORMATION PROVISION SYSTEM, SERVER, AND INFORMATION PROVISION METHOD

TECHNICAL FIELD

The invention relates to an information provision system, a server, and an information provision method that provide pieces of information on the basis of respective conditions of a plurality of vehicles.

BACKGROUND ART

For example, in a system described in Patent Literature 1, a map data transmitting apparatus selects a map area to be transmitted to a mobile terminal, on the basis of the current location and traveling speed of a vehicle having the mobile terminal mounted thereon, and sets priorities for the sequence of transmission for map parts forming the map area. Then, the map data transmitting apparatus calculates, for each map part, a scheduled display time at which map data is displayed on the mobile terminal, and sets a transmission schedule for the map parts on the basis of the priorities and scheduled display times.

By doing so, more detailed map data can be efficiently delivered to the mobile terminal even through wireless communication with communication instability.

CITATION LIST

Patent Literatures

Patent Literature 1: JP 2001-235335 A

SUMMARY OF INVENTION

Technical Problem

However, the system described in Patent Literature 1 is to select a map area on the basis of the current location, traveling speed of a vehicle or the like, and set a transmission schedule for each map part forming the map area.

As such, since a transmission schedule is determined using only the conditions of a single vehicle, when pieces of information are requested by an in-vehicle device mounted on each of a plurality of vehicles, an appropriate transmission schedule in accordance with the condition of each vehicle cannot be determined.

For example, since locations where vehicles are traveling are not used, there is a possibility that wasteful communication may be performed on an in-vehicle device mounted on a vehicle traveling through an incommunicable region among in-vehicle devices having requested information.

In addition, since the type of information requested for transmission is not used, when information that needs to be provided in real time is presented on an in-vehicle device, the information may not be able to be transmitted at appropriate timing.

The invention is to solve the above-described problems, and an object of the invention is to obtain an information provision system, a server, and an information provision method that are capable of providing pieces of information requested by in-vehicle devices of a plurality of vehicles, at appropriate timing determined on the basis of the types of information and the internal and external conditions of the vehicles.

Solution to Problem

An information provision system according to the invention includes a receiver, a controller, and a transmitter.

The receiver receives request information and condition information, the request information including various pieces of information requested by an in-vehicle device mounted on each of a plurality of vehicles, and the condition information indicating internal and external conditions of the each vehicle.

The controller sets priorities for information transmission for types of various pieces of information included in the request information and for the internal and external conditions of each vehicle indicated by the condition information, and extends communication bandwidth allocated for transmission of pieces of information in descending order of the priorities, and determines a transmission schedule for transmitting pieces of information to each in-vehicle device, on a basis of the priorities, the request information and the condition information being received by the receiver.

The transmitter transmits the pieces of information to each in-vehicle device, in accordance with the transmission schedule determined by the controller.

Advantageous Effects of Invention

According to the invention, priorities for information transmission are set for the type of each piece of information requested by an in-vehicle device mounted on each of a plurality of vehicles, and for the internal and external conditions of each vehicle, and pieces of information are transmitted to the in-vehicle devices, in accordance with a transmission schedule determined on the basis of the priorities. By doing so, pieces of information requested by the in-vehicle devices of the plurality of vehicles can be provided at appropriate timing on the basis of the types of pieces of information and the internal and external conditions of the vehicles.

BRIEF DESCRIPTION OF DRAWINGS

FIG. 7 is a flowchart showing a process of providing information which is performed by the server.

FIG. 8 is a diagram showing an example of conditions for scheduling determination for information provision and scheduling results.

DESCRIPTION OF EMBODIMENTS

To describe the invention in more details, a mode for carrying out the invention will be described below with reference to the accompanying drawings.

First Embodiment

Figure 1:
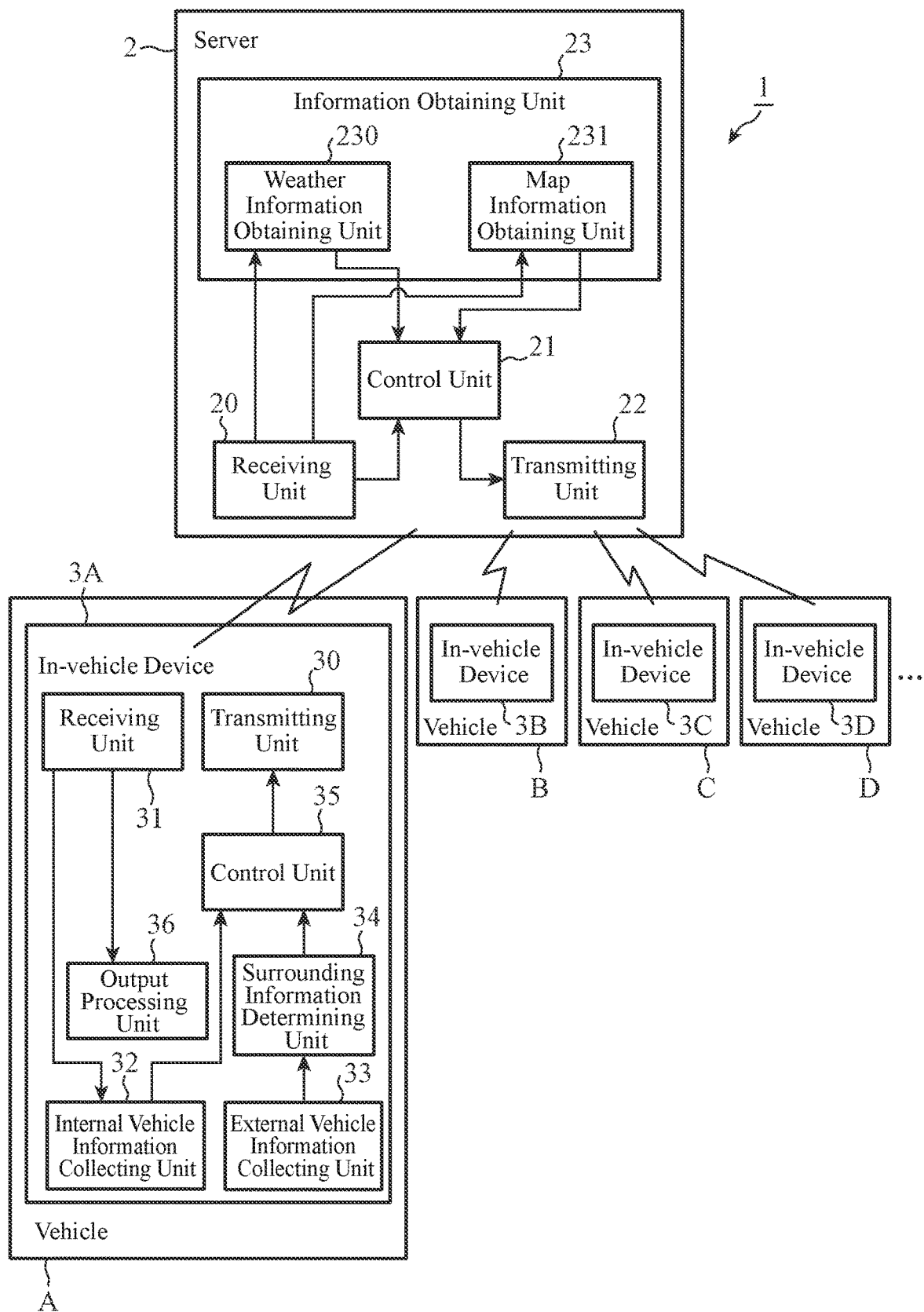
FIG. 1 is a block diagram showing a configuration of an information provision system according to a first embodiment of the invention.

FIG. 1 is a block diagram showing a configuration of an information provision system 1 according to a first embodiment of the invention. The information provision system 1 is a system that provides pieces of information requested by vehicle sides, and includes a server 2 and in-vehicle devices 3A to 3D mounted on respective vehicles A to D.

The server 2 is a server apparatus that transmits pieces of information requested by the in-vehicle devices 3A to 3D to the vehicles A to D at appropriate timing, and includes a receiving unit 20, a control unit 21, a transmitting unit 22, and an information obtaining unit 23.

Note that the server 2 may be any apparatus as long as the apparatus is capable of performing wireless communication with the in-vehicle devices 3A to 3D through a communication network and has computing capabilities of processing pieces of information received from the in-vehicle devices 3A to 3D. Hence, the server 2 may be an apparatus provided separately from the in-vehicle devices 3A to 3D, and one of the in-vehicle devices 3A to 3D having high computing capabilities may be allowed to function as the server 2.

The receiving unit 20 receives, by wireless communication, pieces of information transmitted from the in-vehicle devices 3A to 3D.

The wireless communication includes, for example, wireless communication through a roadside wireless communication apparatus installed on a vehicle's traveling road. In addition, the wireless communication may be vehicle-to-vehicle communication via a wireless communication apparatus mounted on a vehicle. Furthermore, wireless communication through a relay apparatus for a wireless local area network (LAN) around a vehicle, a relay apparatus for a telephone line, or mobile communication may be used.

The pieces of information received by the receiving unit 20 from the in-vehicle devices 3A to 3D include pieces of request information indicating respective pieces of information, which are requested by the in-vehicle devices 3A to 3D, and pieces of condition information indicating the respective conditions of the vehicles A to D.

The pieces of request information are pieces of information indicating pieces of communication content reproduced by the in-vehicle devices 3A to 3D, and the pieces of communication content are requested by applications executed by the in-vehicle devices 3A to 3D.

The pieces of communication content include map information requested by a navigation application, web information requested by a web browser, stream data requested by a content reproduction application, or the like.

The map information includes map information including an area in a predetermined range around a vehicle or around a route. The map information may include facility information, road information, or the like.

The web information is information provided by various types of web sites, such as news distributed on the Internet, Internet shopping, and Internet reservations.

The stream data is data such as video and music which are sequentially transmitted from the server 2, and is received and reproduced by the in-vehicle devices 3A to 3D.

In addition, the pieces of request information each include information for identifying information requested by the above-described application. For example, the information for identifying information requested by the application includes the type of information, information indicating a location where the information is held, identification information required to read the information from the location where the information is held, or the like.

Note that the type of information is used to determine whether the information needs to be provided in real-time when the information is presented on the in-vehicle devices 3A to 3D. For example, when the type of information is map information, since a map needs to be displayed while being updated in accordance with the traveling of the vehicle, the server 2 side determines that the information needs to be provided in real-time. On the other hand, when the type is web information, the information is determined to be one that need not be provided in real-time for the presentation of the information.

The pieces of condition information are pieces of information including, for example, pieces of information indicating the internal conditions of the vehicles A to D having the in-vehicle devices 3A to 3D mounted thereon, and pieces of information indicating conditions around the vehicles A to D.

The pieces of information indicating the internal conditions of the vehicles A to D include the current locations, traveling speeds, traveling orientations, and conditions of communication radio waves of the vehicles A to D which are detected by the in-vehicle devices 3A to 3D. The pieces of information indicating conditions around the vehicles A to D include traffic conditions around the vehicles A to D and visibility conditions around the vehicles A to D.

The control unit 21 sets priorities for information transmission for the types of pieces of information indicated by the pieces of request information and for the conditions of the respective vehicles indicated by the pieces of condition information, and determines a transmission schedule for transmitting pieces of information to the in-vehicle devices 3A to 3D, on the basis of the priorities, the pieces of request information and the pieces of condition information being received by the receiving unit 20.

For example, the control unit 21 calculates priorities for each of the in-vehicle devices 3A to 3D having requested information, by adding a priority score which is preset for each type of information to a priority score which is preset for each of the conditions of the vehicles A to D. Then, the control unit 21 determines a transmission schedule for transmitting pieces of information to the in-vehicle devices 3A to 3D, in descending order of the calculated priorities.

In addition, the control unit 21 generates pieces of information that match the requests from the in-vehicle devices 3A to 3D, using weather information and map information which are periodically obtained by the information obtaining unit 23.

For example, when map information for an area around a vehicle is requested, the control unit 21 extracts map information for a range including a current location of the vehicle and an area therearound, from map information of the latest version which is obtained by the information obtaining unit 23, and generates transmission information. By this, information can be prepared at earlier timing than when an external apparatus generates information to be transmitted.

Therefore, it becomes possible for the in-vehicle devices 3A to 3D to more quickly obtain and present pieces of information requested to the server 2.

The transmitting unit 22 transmits the pieces of information to the in-vehicle devices 3A to 3D, in accordance with the transmission schedule determined by the control unit 21.

For example, pieces of information requested by the in-vehicle devices 3A to 3D side are transmitted to the in-vehicle devices 3A to 3D from the transmitting unit 22 by wireless communication.

The wireless communication includes, for example, wireless communication through roadside wireless communication apparatuses installed on traveling roads of the vehicles A to D. In addition, the wireless communication may be vehicle-to-vehicle communication via wireless communication apparatuses mounted on the vehicles A to D. Furthermore, wireless communication through a relay apparatus for a wireless LAN around a vehicle, a relay apparatus for a telephone line, or mobile communication may be used.

The information obtaining unit 23 is a component that obtains pieces of information to be transmitted to the in-vehicle devices 3A to 3D, and includes, in the example shown in FIG. 1, a weather information obtaining unit 230 and a map information obtaining unit 231.

The weather information obtaining unit 230 is a component that obtains weather information from an external apparatus, and obtains, for example, weather information that is received by the receiving unit 20 from a weather information site on the Internet. Note that the weather information obtaining unit 230 may obtain weather information for all regions to which the services of the information provision system 1 are provided, but may obtain only weather information particularly for a region with such bad weather that may cause trouble in driving a vehicle.

The map information obtaining unit 231 is a component that obtains map information from an external apparatus, and obtains, for example, map information that is received by the receiving unit 20 from a map information site on the Internet. In addition, the map information obtaining unit 231 obtains, by the receiving unit 20, map information for regions to which the services of the information provision system 1 are provided, and updates the map information in an area where a change has been made.

Note that the server 2 according to the first embodiment may obtain information to be transmitted to an in-vehicle device, from an external apparatus.

For example, an external apparatus provided separately from the server 2 obtains and holds pieces of information to be transmitted to in-vehicle devices. Then, the external apparatus transmits one of the pieces of held information that matches a request from an in-vehicle device, to the server 2. The server 2 transmits the information received from the external apparatus, further to the in-vehicle device which is a request source. In this case, the information obtaining unit 23 can be omitted in the server 2.

The in-vehicle devices 3A to 3D are apparatuses mounted on or carried into the vehicles A to D to reproduce information received from an external source and provide the information to passengers on the vehicles, and are implemented by, for example, a car navigation apparatus, an audio device with a display, or the like.

In addition, each of the in-vehicle devices 3A to 3D includes a transmitting unit 30, a receiving unit 31, an internal vehicle information collecting unit 32, an external vehicle information collecting unit 33, a surrounding information determining unit 34, a control unit 35, and an output processing unit 36.

The transmitting unit 30 transmits the above-described request information and condition information indicating the conditions of the vehicle having the device mounted thereon to the server 2 by wireless communication.

The receiving unit 31 receives information requested by the device from the server 2 by wireless communication.

The wireless communication performed by the transmitting unit 30 and the receiving unit 31 includes, for example, wireless communication through a roadside wireless communication apparatus. In addition, wireless communication through any of a wireless LAN, a telephone line, and mobile communication may be used.

The internal vehicle information collecting unit 32 is a component that collects internal vehicle information indicating the internal conditions of the vehicle having the device mounted thereon, and obtains internal vehicle information from information detected by various types of sensors mounted on the vehicle.

The internal vehicle information includes the current location, traveling speed, and traveling orientation of the vehicle having the device mounted thereon, and the conditions of communication radio waves of the device.

For example, a vehicle location measured by a global positioning system (GPS) mounted on the vehicle or the in-vehicle device is collected. In addition, a traveling speed is collected from an electronic control unit (ECU) of the vehicle. Furthermore, a traveling orientation detected by an orientation sensor mounted on the vehicle is collected.

Note that information indicating the conditions of communication radio waves includes information such as the electric field strength for reception of radio waves by the receiving unit 31 and the frequency of occurrence of communication errors.

The external vehicle information collecting unit 33 is a component that collects external vehicle information indicating conditions around the vehicle having the device mounted thereon, and obtains external vehicle information from information detected by various types of sensors mounted on the vehicle.

The external vehicle information includes traffic conditions around the vehicle and visibility conditions around the vehicle. For example, the external vehicle information collecting unit 33 obtains congestion information or accident information received by the receiving unit 31 from an information delivering service such as vehicle information and communication system (VICS; registered trademark, this statement is hereinafter omitted), as information indicating traffic conditions around the vehicle.

In addition, information indicating visibility conditions around the vehicle includes a photographed image of an area around the vehicle which is photographed by a camera mounted on the vehicle, sound information of an area around the vehicle which is obtained by a microphone mounted on the vehicle, and the like. For example, when the sound of rain is collected as sound information and a photographed image shows that an area around the vehicle is under the rainy weather, there is a possibility that visibility around the vehicle may be poor.

The surrounding information determining unit 34 determines conditions around the vehicle on the basis of the external vehicle information collected by the external vehicle information collecting unit 33. For example, the surrounding information determining unit 34 classifies each of conditions around the vehicle into levels, and notifies the control unit 35 of the levels of the respective conditions, as information indicating conditions around the vehicle.

When there is a request for information to the server 2 in a process of an application executed on the in-vehicle device, the control unit 35 generates request information indicating the information requested by the application.

Furthermore, the control unit 35 generates condition information indicating the internal and external conditions of the vehicle, on the basis of the internal vehicle information notified by the internal vehicle information collecting unit 32 and the information indicating conditions around the vehicle which is notified by the surrounding information determining unit 34. The thus generated request information and condition information are outputted to the transmitting unit 30 from the control unit 35. The transmitting unit 30 transmits the request information and the condition information to the server 2.

The output processing unit 36 converts information received by the receiving unit 31 from the server 2 into a format that allows the information to be outputted from a monitor or a speaker, and outputs the information.

For example, the output processing unit 36 reproduces map information, web information, stream data, or the like, and displays it on the monitor.

Figure 2A:
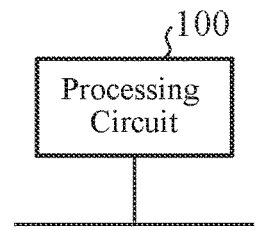
FIG. 2A is a block diagram showing hardware that implements the functions of a server of the first embodiment.
Figure 2B:
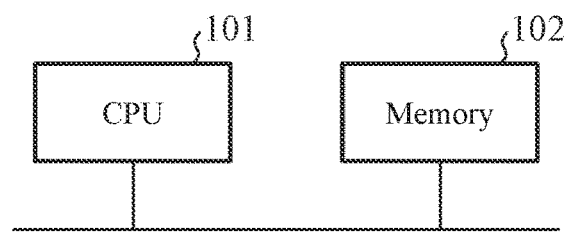
FIG. 2B is a block diagram showing hardware that executes software that implements the functions of the server of the first embodiment.

FIG. 2A is a block diagram showing hardware that implements the functions of the server 2 of the first embodiment. FIG. 2B is a block diagram showing hardware that executes software that implements the functions of the server 2 of the first embodiment. The functions of the receiving unit 20, the control unit 21, and the transmitting unit 22 of the server 2 according to the first embodiment are implemented by a processing circuit.

Namely, the server 2 includes a processing circuit for receiving pieces of request information indicating pieces of information requested by the in-vehicle devices 3A to 3D mounted on the vehicles A to D, and pieces of condition information indicating the internal and external conditions of the vehicles A to D, setting priorities for information transmission for the types of respective pieces of information indicated by the pieces of request information and for the internal and external conditions of the vehicles A to D indicated by the pieces of condition information, determining a transmission schedule for transmitting pieces of information to the in-vehicle devices 3A to 3D, on the basis of the priorities, and transmitting the pieces of information to the in-vehicle devices 3A to 3D, in accordance with the transmission schedule.

The processing circuit may be dedicated hardware, or a central processing unit (CPU) or graphics processing unit (GPU) that reads and executes a program stored in a memory.

When the processing circuit is a processing circuit 100 which is dedicated hardware shown in FIG. 2A, the processing circuit 100 corresponds, for example, to a single circuit, a combined circuit, a programmed processor, a parallel programmed processor, an application specific integrated circuit (ASIC), a field-programmable gate array (FPGA), or a combination thereof.

In addition, each of the functions of the receiving unit 20, the control unit 21, and the transmitting unit 22 may be implemented by a processing circuit, or the functions may be all together implemented by a single processing circuit.

When the processing circuit is a CPU 101 shown in FIG. 2B, the functions of the receiving unit 20, the control unit 21, and the transmitting unit 22 are implemented by software, firmware, or a combination of software and firmware. The software and firmware are described as programs and stored in a memory 102. The CPU 101 implements each function by reading and executing the programs stored in the memory 102.

Namely, the server 2 includes the memory 102 for storing programs. When the programs are executed by the processing circuit, the following steps are consequently performed: a step of receiving pieces of request information indicating pieces of information requested by the in-vehicle devices 3A to 3D mounted on the vehicles A to D, and pieces of condition information indicating the internal and external conditions of the vehicles A to D; a step of setting priorities for information transmission for the types of respective pieces of information indicated by the pieces of request information and for the internal and external conditions of the vehicles A to D indicated by the pieces of condition information, and determining a transmission schedule for transmitting pieces of information to the in-vehicle devices 3A to 3D, on the basis of the priorities; and a step of transmitting the pieces of information to the in-vehicle devices 3A to 3D, in accordance with the determined transmission schedule. In addition, these programs cause a computer to perform procedures or methods for the receiving unit 20, the control unit 21, and the transmitting unit 22.

Here, the memory corresponds, for example, to a nonvolatile or volatile semiconductor memory such as a random access memory (RAM), a ROM, a flash memory, an erasable programmable ROM (EPROM), or an electrically EPROM (EEPROM), a magnetic disk, a flexible disk, an optical disc, a compact disc, a MiniDisc, a digital versatile disc (DVD), or the like.

Some of the functions of the receiving unit 20, the control unit 21, and the transmitting unit 22 may be implemented by dedicated hardware, and some may be implemented by software or firmware. For example, the functions of the receiving unit 20 and the transmitting unit 22 are implemented by the processing circuit 100 which is dedicated hardware, and the function of the control unit 21 is implemented by the CPU 101 executing a program stored in the memory 102. As such, the processing circuit can implement the above-described functions by hardware, software, firmware, or a combination thereof.

Note that the same also applies to the functions of the transmitting unit 30, the receiving unit 31, the internal vehicle information collecting unit 32, the external vehicle information collecting unit 33, the surrounding information determining unit 34, and the control unit 35 in the in-vehicle devices 3A to 3D.

Next operation will be described.

Figure 3:
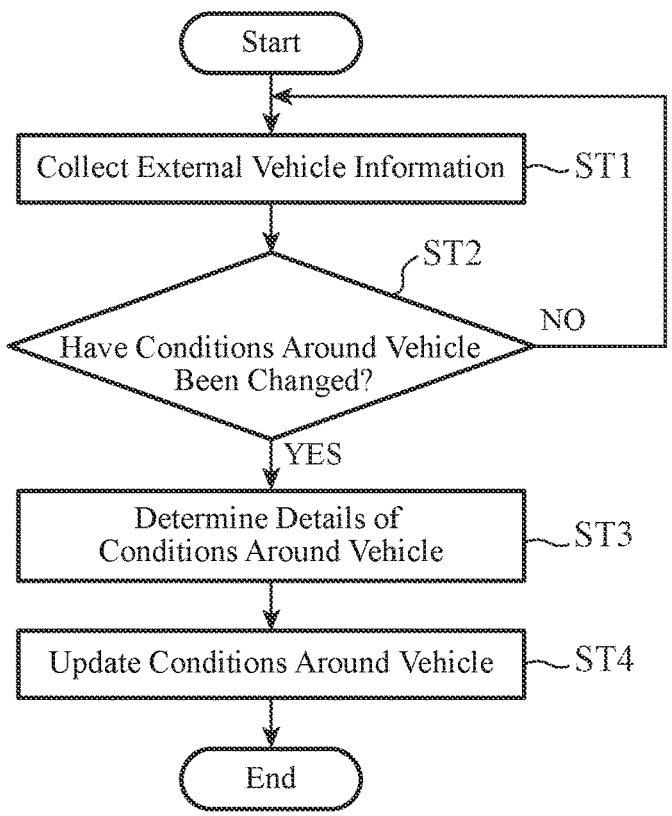
FIG. 3 is a flowchart showing a process of updating external vehicle information which is performed by in-vehicle devices.

FIG. 3 is a flowchart showing a process of updating external vehicle information which is performed by the in-vehicle devices 3A to 3D.

In the following, the operation of the in-vehicle device 3A mounted on the vehicle A is shown as an example. Namely, a series of processes shown in FIG. 3 are also identical in terms of the in-vehicle devices 3B to 3D mounted on the vehicles B to D.

First, the external vehicle information collecting unit 33 of the in-vehicle device 3A collects external vehicle information of the vehicle A (step ST1). At this time, the external vehicle information collecting unit 33 compares external vehicle information previously collected and saved with external vehicle information collected most recently and determines, on the basis of a result of the comparison, whether conditions around the vehicle A have been changed (step ST2).

If there is no change in conditions around the vehicle A (step ST2; NO), processing returns to the process at step ST1, and collection of external vehicle information is repeated.

On the other hand, if conditions around the vehicle A have been changed (step ST2; YES), the external vehicle information collecting unit 33 outputs the external vehicle information collected at this time to the surrounding information determining unit 34.

The surrounding information determining unit 34 determines details of the conditions around the vehicle A, on the basis of the external vehicle information collected by the external vehicle information collecting unit 33 (step ST3).

For example, when the vehicle speed of the vehicle A is high, this necessitates frequent updating of map information in a vehicle traveling direction. Hence, the surrounding information determining unit 34 determines a level of the vehicle speed of the vehicle A. For the levels of the vehicle speed, four levels, fast, normal, slow, and stop, are used.

In addition, when the visibility around the vehicle becomes poor due to rain, fog, or the like, a subject in an image obtained by photographing the surroundings of the vehicle A also becomes blurred. Hence, as for visibility conditions around the vehicle, the visibility conditions are classified into levels in accordance with the degree of sharpness of a subject in an image obtained by photographing the surroundings of the vehicle A. When a subject in front of the vehicle A is blurred due to rain or fog, it is determined that the visibility conditions around the vehicle A have a poor level.

Furthermore, when a road is jammed, since vehicle speed cannot be increased, this eliminates frequent updating of map information in a vehicle traveling direction, compared to a case where the vehicle travels at high speed.

Hence, when a road in the traveling direction of the vehicle A is jammed, the surrounding information determining unit 34 determines a congestion encounter level, on the basis of the time taken until the vehicle A approaches a congestion area from a current location of the vehicle A.

Note that, when the time taken for the vehicle A to approach a congestion area is short, it is determined that the congestion encounter level is high.

Furthermore, the surrounding information determining unit 34 determines a level of communication conditions ahead of the vehicle A, on the basis of the time taken until the vehicle A approaches an incommunicable area such as a tunnel from a current location of the vehicle A.

When the time taken until the vehicle A approaches an incommunicable area is shorter than a threshold time, it is determined that the communication conditions ahead of the vehicle A have a poor level.

The results thus determined by the surrounding information determining unit 34 are notified to the control unit 35, as information indicating conditions around the vehicle A.

The control unit 35 updates the information indicating conditions around the vehicle A which is held before, with the information indicating conditions around the vehicle A which are determined by the surrounding information determining unit 34 (step ST4).

By this, information indicating conditions around the vehicle A is always updated to information indicating new conditions.

Figure 4:
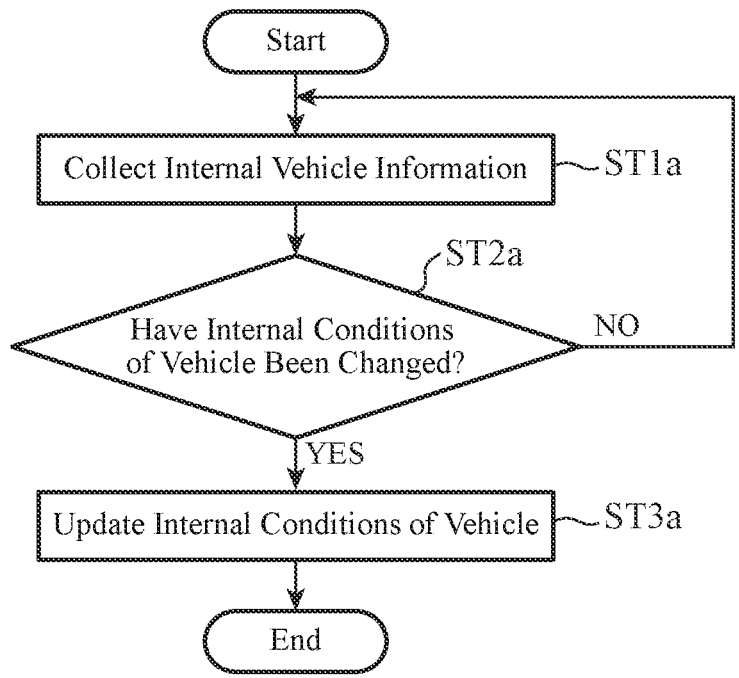
FIG. 4 is a flowchart showing a process of updating internal vehicle information which is performed by the in-vehicle devices.

FIG. 4 is a flowchart showing a process of updating internal vehicle information which is performed by the in-vehicle devices 3A to 3D.

In the following, the operation of the in-vehicle device 3A mounted on the vehicle A is shown as an example. Namely, a series of processes shown in FIG. 4 are also identical in the in-vehicle devices 3B to 3D mounted on the vehicles B to D.

The internal vehicle information collecting unit 32 collects internal vehicle information of the vehicle A (step ST1a). At this time, the internal vehicle information collecting unit 32 compares internal vehicle information previously collected and saved with internal vehicle information collected most recently and determines, on the basis of a result of the comparison, whether the internal conditions of the vehicle A have been changed (step ST2a).

If there is no change in the internal conditions of the vehicle A (step ST2a; NO), processing returns to the process at step ST1a, and collection of internal vehicle information is repeated.

On the other hand, if the internal conditions of the vehicle A have been changed (step ST2a; YES), the internal vehicle information collecting unit 32 outputs the internal vehicle information collected at this time to the control unit 35.

The control unit 35 updates the information indicating the internal conditions of the vehicle A which is held before, with the internal vehicle information inputted from the internal vehicle information collecting unit 32 (step ST3a). By this, information indicating the internal conditions of the vehicle A is updated to information indicating new conditions.

Figure 5:
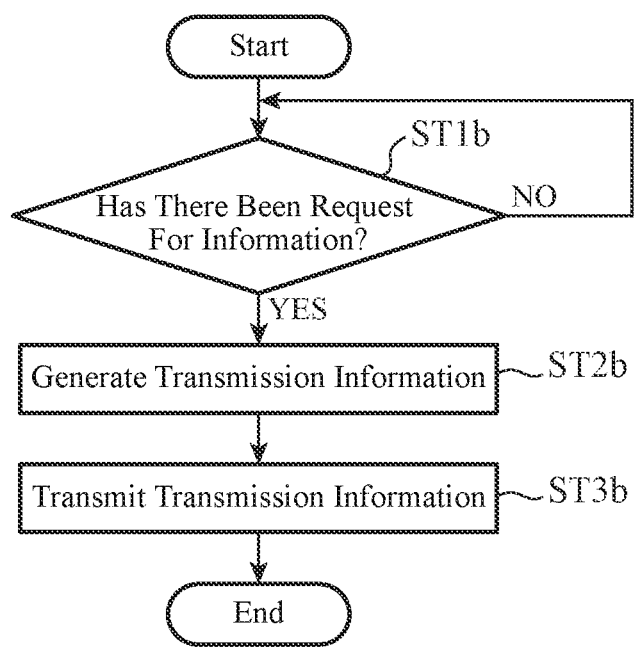
FIG. 5 is a flowchart showing a process of requesting information which is performed by the in-vehicle devices.

FIG. 5 is a flowchart showing a process of requesting information which is performed by the in-vehicle devices 3A to 3D.

In the following, the operation of the in-vehicle device 3A mounted on the vehicle A is shown as an example. Namely, a series of processes shown in FIG. 5 are also identical in the in-vehicle devices 3B to 3D mounted on the vehicles B to D.

First, the control unit 35 determines whether there has been a request for information from an application executed on the in-vehicle device 3A (step ST1b). Here, if there is no request for information from the application (step ST1b; NO), the determination at step ST1b is repeated.

If there has been a request for information from the application (step ST1b; YES), the control unit 35 generates request information indicating the information requested by the application.

For example, as information for identifying the information requested by the application, the control unit 35 obtains the type of requested information, information indicating a location where the information is held, identification information required to read the information from the location where the information is held, or the like and generates request information in which these pieces of information are put together.

Furthermore, the control unit 35 generates condition information indicating the internal and external conditions of the vehicle, on the basis of internal vehicle information notified by the internal vehicle information collecting unit 32 and information indicating conditions around the vehicle A which is notified by the surrounding information determining unit 34.

The control unit 35 generates transmission information in which the request information and the condition information are put together (step ST2b). The transmitting unit 30 transmits the transmission information generated by the control unit 35 to the server 2 (step ST3b).

Next, operation performed by the server 2 will be described.

Figure 6:
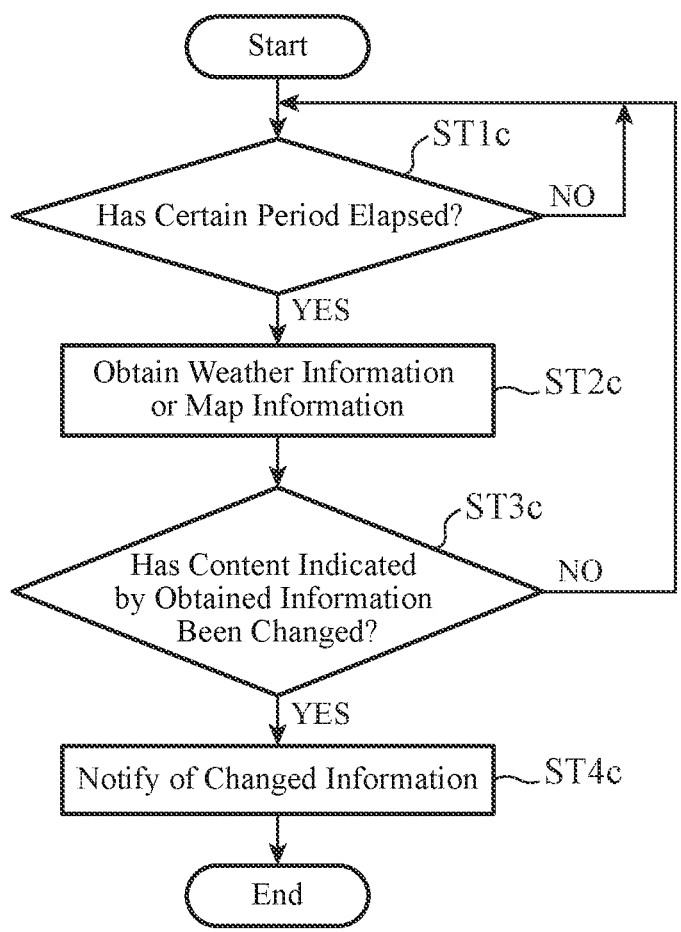
FIG. 6 is a flowchart showing a process of updating information which is performed by the server.

FIG. 6 is a flowchart showing a process of updating information which is performed by the server 2.

First, the information obtaining unit 23 determines whether a certain period has elapsed from a time point when information to be transmitted to the in-vehicle devices 3A to 3D is obtained last time (step ST1c).

For example, since the weather is highly likely to change over about several hours, in the weather information obtaining unit 230 the period is about several hours. In addition, since map information is likely to be updated in about several days to several months, in the map information obtaining unit 231 the period is any number of days ranging from about several days to several months.

If the period has not elapsed (step ST1c; NO), the determination at step ST1c is repeated.

On the other hand, if the certain period has elapsed from a time point when information is obtained last time (step ST1c; YES), the weather information obtaining unit 230 allows the receiving unit 20 to access a weather information site on the Internet to obtain weather information. In addition, the map information obtaining unit 231 allows the receiving unit 20 to access a map information site on the Internet to obtain map information. These processes correspond to step ST2c.

Then, the information obtaining unit 23 compares the information obtained last time with the information obtained this time and determines, on the basis of a result of the comparison, whether there has been a change in the content of the information (step ST3c).

Here, if there is no change in the content of the information (step ST3c; NO), processing returns to the process at step ST1c.

On the other hand, if there has been a change in the content of the information (step ST3c; YES), i.e., if there has been a change in the weather or if the map information has been updated to the latest version, the information obtaining unit 23 notifies the control unit 21 of the information obtained this time (step ST4c). The control unit 21 holds the information notified by the information obtaining unit 23. In this manner, information to be transmitted which is held by the control unit 21 is updated.

FIG. 7 is a flowchart showing a process of providing information which is performed by the server 2.

The control unit 21 determines, on the basis of information received by the receiving unit 20, whether there have been requests for transmission of information from the in-vehicle devices 3A to 3D (step ST1d).

Namely, the control unit 21 determines whether the receiving unit 20 has received request information and condition information from the in-vehicle devices 3A to 3D. If there has been no request for transmission of information (step ST1d; NO), processing returns to step ST1d and the above-described determination is repeated.

In the following, a case in which there have been requests for transmission of information from the in-vehicle devices 3A to 3D is shown as an example.

If there have been requests for transmission of information from the in-vehicle devices 3A to 3D (step ST1d; YES), the control unit 21 determines a transmission schedule for the information, on the basis of the request information and condition information received from the in-vehicle devices 3A to 3D (step ST2d).

After determining the transmission schedule, the control unit 21 generates each piece of information requested by the in-vehicle devices 3A to 3D, as response information. Then, the transmitting unit 22 transmits the pieces of response information requested by the respective in-vehicle devices 3A to 3D to the in-vehicle devices 3A to 3D which are request sources, in accordance with the transmission schedule determined by the control unit 21 (step ST3d).

Then, the control unit 21 determines whether the transmission of the information to the in-vehicle devices 3A to 3D has succeeded (step ST4d). For example, the determination is made on the basis of whether the receiving unit 20 has received response information indicating that the reception of the information is completed, from the in-vehicle devices 3A to 3D.

Here, if the transmission of the information to the in-vehicle devices 3A to 3D has succeeded (step ST4d; YES), the process ends.

If the transmission of the information to the in-vehicle devices 3A to 3D has failed (step ST4d; NO), the control unit 21 determines whether the number of transmissions including the transmission performed this time has exceeded a predetermined number of retransmissions (step ST5d). If the number of transmissions including the transmission performed this time has not exceeded the number of retransmissions (step ST5d; NO), processing returns to the process at step ST3d. By this, the transmitting unit 22 retransmits the information to the in-vehicle devices 3A to 3D, in accordance with the above-described transmission schedule.

If the number of transmissions including the transmission performed this time has exceeded the number of retransmissions (step ST5d; YES), the control unit 21 updates the conditions of communication radio waves for the in-vehicle devices 3A to 3D, on the basis of the conditions of occurrence of transmission errors (step ST6d). For example, the control unit 21 accumulates the number of occurrences of a transmission error or the communication error rate every time information is retransmitted to the in-vehicle devices 3A to 3D. Then, when the number of transmissions including the transmission performed this time has exceeded the number of retransmissions, the control unit 21 lowers the level of the conditions of communication radio waves identified on the basis of condition information received from the in-vehicle devices 3A to 3D, to a level determined on the basis of the number of occurrences of a transmission error or the communication error rate. After this, processing transitions to step ST2d, by which a transmission schedule is determined again on the basis of the conditions of communication radio waves updated at step ST6d. As such, the conditions of communication radio waves can be updated on the basis of the results of actual communication.

Next, the process at step ST2d will be described using a specific example.

FIG. 8 is a diagram showing an example of conditions a for scheduling determination for information provision and scheduling results β. In FIG. 8, in a condition A, the vehicle speed is classified into four levels, and a priority score for information transmission is set for each level. Each level is identified by a first threshold value and a second threshold value for vehicle speed. Note that the first threshold value is a larger value than the second threshold value.

For example, a vehicle speed greater than the first threshold value has a "fast" level, and the control unit 21 sets this level to +2 as a priority score. In addition, a vehicle speed less than or equal to the first threshold value and exceeding the second threshold value has a "normal" level. The control unit 21 sets this level to +1 as a priority score. When a vehicle speed is greater than 0 and less than or equal to the second threshold value, the vehicle speed has a "slow" level. The control unit 21 sets this level to 0 as a priority score. A vehicle being stopped has a "stop" level. The control unit 21 sets this level to −1 as a priority score. As such, the condition A is provided on the assumption that the higher is the vehicle speed, it is more likely that information needs to be presented in real time, and a high score is set for the fast level of the vehicle speed.

In addition, in a condition B, the conditions of communication radio waves are classified into three levels, and a priority score for information transmission is set for each level. Each level is identified by a first threshold value and a second threshold value for the electric field strength for reception of radio waves. Note that the first threshold value is a larger value than the second threshold value.

For example, when the electric field strength for reception of radio waves is greater than the first threshold value, the conditions of communication radio waves have an "excellent" level. The control unit 21 sets this level to +2 as a priority score.

When the electric field strength for reception is less than or equal to the first threshold value and exceeding the second threshold value, the conditions of communication radio waves have a "normal" level. The control unit 21 sets this level to +1 as a priority score.

When the electric field strength for reception is less than or equal to the second threshold value, the conditions of communication radio waves have a "poor" level. The control unit 21 sets this level to 0 as a priority score.

Note that a level of the conditions of communication radio waves may be determined using a value indicating the actual communication performance such as the number of occurrences of an error or the communication error rate.

As such, the condition B is provided on the assumption that the higher is the electric field strength for reception of radio waves, it is more likely that information can be efficiently transmitted, and a high score is set for the high level of the electric field strength for reception of radio waves.

In a condition C, communication conditions ahead of the vehicle is classified into three levels, and a priority score for information transmission is set for each level. Each level is identified by a first threshold time and a second threshold time regarding a time taken until the vehicle approaches an incommunicable area such as a tunnel. Note that the first threshold time is a longer time than the second threshold time.

For example, when the time taken until the vehicle approaches an incommunicable area is longer than the first threshold time, the communication conditions ahead of the vehicle have an "excellent" level. The control unit 21 sets this level to +2 as a priority score. In addition, when the time taken until the vehicle approaches an incommunicable area is less than or equal to the first threshold time and longer than the second threshold time, the communication conditions ahead of the vehicle have a "normal" level. The control unit 21 sets this level to +1 as a priority score. Furthermore, when the time taken until the vehicle approaches an incommunicable area is less than or equal to the second threshold time, the communication conditions ahead of the vehicle have a "poor" level. The control unit 21 sets this level to 0 as a priority score.

As such, the condition C is provided on the assumption that the longer is the time taken until the vehicle approaches an incommunicable area, it is more likely that information can be efficiently transmitted, and a high score is set for the level at which a time taken until the vehicle approaches an incommunicable area is long.

In a condition D, visibility conditions around the vehicle are classified into three levels, and a priority score for information transmission is set for each level. Each level is identified by a first threshold value and a second threshold value for visibility conditions. Note that the first threshold value is a larger value than the second threshold value.

For example, when the degree of clearness of visibility is greater than the first threshold value, the visibility conditions around the vehicle have an "excellent" level. The control unit 21 sets this level to +2 as a priority score. In addition, when the degree of clearness of visibility is less than or equal to the first threshold value and greater than the second threshold value, the visibility conditions around the vehicle have a "normal" level. The control unit 21 sets this level to +1 as a priority score.

When the degree of clearness of visibility is less than or equal to the second threshold value, the visibility conditions around the vehicle have a "poor" level. The control unit 21 sets this level to a priority score of 0.

As such, the condition D is provided on the assumption that the better is visibility conditions around the vehicle, it is more likely that information can be efficiently transmitted, and a high score is set for the excellent level of the visibility conditions around the vehicle.

For a condition E, three types of communication content are registered, and a priority score for information transmission is set for each type.

For example, when the type of communication content is map information, the control unit 21 sets this information to +5 as a priority score. When the type of communication content is streaming, the control unit 21 sets this information to +4 as a priority score. In addition, when the type of communication content is web information, the control unit 21 sets this information to +1 as a priority score. As such, the condition E is provided on the assumption that communication content needs to be provided in real time, and a high score is set for a type of communication content that needs to be provided in real time.

At step ST2d, the control unit 21 extracts vehicle speeds, conditions of communication radio waves, communication conditions ahead of the vehicle, and visibility conditions around the vehicle, as conditions a for scheduling determination, from pieces of condition information received from the in-vehicle devices 3A to 3D. In addition, the control unit 21 extracts the types of communication content from pieces of request information received from the in-vehicle devices 3A to 3D.

Note that the vehicle speeds, conditions of communication radio waves, communication conditions ahead of the vehicle, and visibility conditions around the vehicle of the vehicles A to D are, as described above, classified into levels by the surrounding information determining unit 34.

The control unit 21 sets priority scores for information transmission for each level of the conditions around the vehicle and for each type of communication content. Then, the control unit 21 calculates final priority by adding, for each vehicle, the priority scores set for each level of the conditions around the vehicle to the priority score set for each type of communication content.

For example, in FIG. 8, the conditions A, B, and D for the vehicle A each have a priority score of +2, and the priority score for the condition E is +4. Thus, the priority for information transmission for the in-vehicle device 3A of the vehicle A is "10" which is obtained by adding these priority scores.

Likewise, by adding priority scores for the respective conditions A, B, D and E, the priority for the in-vehicle device 3B of the vehicle B is "5", the priority for the in-vehicle device 3C of the vehicle C is "7", and the priority for the in-vehicle device 3D of the vehicle D is "9".

After this, the control unit 21 determines a sequence of transmitting communication content, i.e., a transmission schedule, in descending order of the priorities for the in-vehicle devices 3A to 3D.

Note that when the priorities are equal like the in-vehicle device 3C of the vehicle C and the in-vehicle device 3D of the vehicle D, the control unit 21 determines a transmission sequence by comparing priority scores for a condition with a high degree of influence on efficient transmission of information among the conditions a for scheduling determination.

For example, while the current conditions of communication radio waves of the vehicle C have a "poor" level, the conditions of communication radio waves of the vehicle D have an "excellent" level. Therefore, if information is transmitted to the in-vehicle device 3C before the in-vehicle device 3D, then due to the poor conditions of communication radio waves, a transmission error is highly likely to occur. Hence, the control unit 21 places the in-vehicle device 3D in an earlier stage in the transmission sequence than the in-vehicle device 3C.

Furthermore, the control unit 21 may extend communication bandwidth allocated for transmission of communication content in descending order of priorities. By this, communication content with a high priority can be efficiently transmitted. In this case, communication bandwidth may be allocated on the basis of priorities that use the scores of the conditions A to E, but as shown in FIG. 8, communication bandwidth may be allocated on the basis of priorities obtained by adding the score of the condition C to the score of the condition E.

The score of the condition C is set on the basis of the time taken until the vehicle approaches an incommunicable area, and when the score is low, it is highly likely that the vehicle receiving communication content may have entered an incommunicable area. In addition, in the condition E is set on the assumption that a high score is set for a type of communication content that needs to be provided in real time.

Hence, by extending and allocating communication bandwidth in descending order of priorities which are obtained by adding the score of the condition C to the score of the condition E, more efficient transmission of communication content is possible.

Note that when priorities obtained by adding the score of the condition C to the score of the condition E are equal, communication bandwidth may be allocated by comparing the scores of the conditions A, B, and D which are other conditions.

For example, in FIG. 8, a priority obtained by adding the score of the condition C to the score of the condition E is "5" for the vehicles C and D.

In this case, while the current conditions of communication radio waves of the vehicle C have a "poor" level, the conditions of communication radio waves of the vehicle D have an "excellent" level. Therefore, if information is transmitted to the in-vehicle device 3C before the in-vehicle device 3D, then due to the poor conditions of communication radio waves, a transmission error is highly likely to occur.

Hence, the control unit 21 increases communication bandwidth used to transmit information to the in-vehicle device 3D with respect to that of the in-vehicle device 3C.

As described above, in the information provision system 1 according to the first embodiment, the receiving unit 20 receives pieces of request information for pieces of information requested by the in-vehicle devices 3A to 3D mounted on each of the vehicles A to D, and pieces of condition information indicating the internal and external conditions of the vehicles A to D. The control unit 21 sets priorities for information transmission for the types of respective pieces of information indicated by the pieces of request information and for the internal and external conditions of the vehicles A to D indicated by the pieces of condition information, and determines a transmission schedule for transmitting pieces of information to the in-vehicle devices 3A to 3D, on the basis of the priorities, the pieces of request information and the pieces of condition information being received by the receiving unit 20. The transmitting unit 22 transmits the pieces of information to the in-vehicle devices 3A to 3D, in accordance with the transmission schedule determined by the control unit 21. With this configuration, pieces of information requested by the in-vehicle devices 3A to 3D can be provided at appropriate timing determined on the basis of the types of pieces of information and the internal and external conditions of the vehicles A to D.

In addition, in the information provision system 1 according to the first embodiment, the control unit 21 updates the conditions of communication radio waves for the in-vehicle devices 3A to 3D, on the basis of the conditions of occurrence of transmission errors. With this configuration, the conditions of communication radio waves can be updated on the basis of the results of actual communication.

Furthermore, in the information provision system 1 according to the first embodiment, the control unit 21 increases communication bandwidth allocated for transmission of information in descending order of priorities. By such a configuration, information with a high priority can be efficiently transmitted.

Furthermore, the information provision system 1 according to the first embodiment includes the information obtaining unit 23 that obtains pieces of information to be transmitted to the in-vehicle devices 3A to 3D. The control unit 21 generates the pieces of information requested by the in-vehicle devices 3A to 3D, on the basis of the pieces of information obtained by the information obtaining unit 23.

By this, it becomes possible to prepare pieces of information to be transmitted at earlier timing, compared with a case where pieces of information that match requests from the in-vehicle devices 3A to 3D are generated by an external apparatus and then transmitted. Therefore, the in-vehicle devices 3A to 3D can more quickly obtain and present pieces of information requested to the server 2.

The server 2 according to the first embodiment includes the receiving unit 20, the control unit 21, the transmitting unit 22, and the information obtaining unit 23 which are shown in FIG. 1. With this configuration, a server apparatus can be implemented that provides pieces of information requested by the in-vehicle devices 3A to 3D at appropriate timing determined on the basis of the types of pieces of information and the conditions of the vehicles A to D.

In addition, in an information provision method according to the first embodiment, at step ST1d of FIG. 7, the receiving unit 20 receives pieces of request information and pieces of condition information from the in-vehicle devices 3A to 3D mounted on the vehicles A to D. Then, at step ST2d, the control unit 21 sets priorities for information transmission for the types of respective pieces of information indicated by the pieces of request information and for the internal and external conditions of the respective vehicles indicated by the pieces of condition information, and determines a transmission schedule on the basis of the priorities, the pieces of request information and the pieces of condition information being received by the receiving unit 20. Then, at step ST3d, the transmitting unit 22 transmits pieces of information to the in-vehicle devices 3A to 3D, in accordance with the transmission schedule determined by the control unit 21. By doing so, pieces of information requested by the in-vehicle devices 3A to 3D can be provided at appropriate timing on the basis of the types of pieces of information and the internal and external conditions of the vehicles A to D.

Note that, in the present disclosure, modifications or omissions within the spirit and scope of the invention may be made to any component of the embodiment.

INDUSTRIAL APPLICABILITY

The information provision system according to the invention can provide pieces of information requested by an in-vehicle device mounted on each of a plurality of vehicles, at timing appropriate to each vehicle, and thus, is suitable for, for example, an in-vehicle information device that is likely to be placed in various conditions of radio waves due to traveling of a vehicle.

REFERENCE SIGNS LIST

1: Information provision system, 2: Server, 3A to 3D: In-vehicle device, 20 and 31: Receiving unit, 21 and 35: Control unit, 22 and 30: Transmitting unit, 23: Information obtaining unit, 32: Internal vehicle information collecting unit, 33: External vehicle information collecting unit, 34: Surrounding information determining unit, 36: Output processing unit, 100: Processing circuit, 101: CPU, 102: Memory, 230: Weather information obtaining unit, and 231: Map information obtaining unit

The invention claimed is:

1. An information provision system comprising:
   a receiver to receive request information and condition information, the request information including various pieces of information requested by in-vehicle devices mounted on a plurality of vehicles, respectively, and the condition information indicating internal and external conditions of each of the plurality of vehicles;
   a controller to
      set priorities for information transmission for respective types of the pieces of information included in the request information from each of the plurality of vehicles, and for the internal and external conditions of each of the plurality of vehicles indicated by the condition information, and
      determine a transmission schedule for transmitting the pieces of information to the in-vehicle devices on a basis of the priorities, the request information and the condition information being received by the receiver; and
   a transmitter to transmit the pieces of information to the in-vehicle devices, in accordance with the transmission schedule determined by the controller,
   wherein the controller extends communication bandwidth allocated for transmission of the pieces of information in descending order of the priorities and determines the transmission schedule.

2. The information provision system according to claim 1, wherein the request information is information indicating communication content to be reproduced on each of the in-vehicle devices.

3. The information provision system according to claim 1, wherein the condition information includes information indicating a current location, a traveling speed, and a traveling orientation of each of the plurality of vehicles, a condition of a communication radio wave of each of the in-vehicle devices, a traffic condition around each of the plurality of vehicles, and a visibility condition around each of the plurality of vehicles.

4. The information provision system according to claim 3, wherein the controller updates the condition of communication radio waves of each of the in-vehicle devices, on a basis of conditions of occurrence of transmission errors.

5. The information provision system according to claim 1, comprising an information obtainer to obtain data from which the pieces of information to be transmitted to each of the in-vehicle devices are extracted, wherein
   the controller extracts the pieces of information requested by each of the in-vehicle devices from the data obtained by the information obtainer.

6. A server comprising:
   an information obtainer to obtain data;
   a receiver to receive request information and condition information, the request information including various pieces of information requested by in-vehicle devices mounted on a plurality of vehicles, respectively, and the condition information indicating internal and external conditions of each of the plurality of vehicles;
   a controller to
      set priorities for information transmission for respective types of the pieces of information included in the request information from each of the plurality of vehicles, and for the internal and external conditions of each of the plurality of vehicles indicated by the condition information,
      determine a transmission schedule for transmitting the pieces of information to the in-vehicle devices on a basis of the priorities, and
      extract the pieces of information to be transmitted to each of the in-vehicle devices from the data obtained by the information obtainer on a basis of the request information and the condition information being received by the receiver; and
   a transmitter to transmit the pieces of information extracted by the controller to the in-vehicle devices, in accordance with the transmission schedule,
   wherein the controller extends communication bandwidth allocated for transmission of the pieces of information in descending order of the priorities and determines the transmission schedule.

7. An information provision method comprising:
   receiving, by a receiver, request information and condition information, the request information including various pieces of information requested by in-vehicle devices mounted on a plurality of vehicles, respectively, and the condition information indicating internal and external conditions of each of the plurality of vehicles;
   setting, by a controller, priorities for information transmission for respective types of the pieces of information included in the request information from each of the plurality of vehicles, and for the internal and external conditions of each of the plurality of vehicles indicated by the condition information, and
   determining, by the controller, a transmission schedule for transmitting the pieces of information to the in-vehicle devices on a basis of the priorities, the request information and the condition information being received by the receiver;
   transmitting, by a transmitter, the pieces of information to the in-vehicle devices, in accordance with the transmission schedule determined by the controller,
   extending, by the controller, communication bandwidth allocated for transmission of the pieces of information in descending order of the priorities and determining, by the controller, the transmission schedule.

* * * * *